UNITED STATES PATENT OFFICE.

HENRY BLUMENBERG, JR., OF LOS ANGELES, CALIFORNIA, ASSIGNOR, BY DIRECT AND MESNE ASSIGNMENTS, TO CARROLL ALLEN, OF LOS ANGELES, CALIFORNIA.

PROCESS OF TREATING PHOSPHATE MATERIAL.

1,251,742. Specification of Letters Patent. Patented Jan. 1, 1918.

No Drawing. Application filed June 21, 1917. Serial No. 176,154.

*To all whom it may concern:*

Be it known that I, HENRY BLUMENBERG, Jr., a citizen of the United States, residing at Los Angeles, in the county of Los Angeles and State of California, have invented new and useful Improvements in Processes of Treating Phosphate Material, of which the following is a specification.

My invention relates to a process of treating phosphate material, such as calcium phosphate, to render the phosphoric acid available for plant life.

The usual process of converting phosphate rock into a fertilizer consists in treating the same with sulfuric acid to produce acid calcium phosphate, the so-called super phosphate of commerce.

It is an object of this invention to render the phosphoric acid of phosphate material, such as phosphate rock, available by a dry process and without the use of sulfuric acid, and which is simple, economical, and does not require expensive apparatus.

It is another object of this invention to treat insoluble phosphate material with ammonium salts capable of reacting with the phosphate material to form soluble ammonium phosphates.

My invention consists in the steps of the process and the resulting product hereinafter described and claimed.

Phosphate material, such as phosphate rock, is ground to an impalpable powder and thoroughly mixed with finely powdered ammonium sulfate in proportion to react as follows:

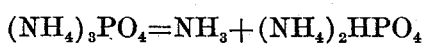

This mixture of ammonium sulfate and calcium phosphate may be used as a fertilizer without any further treatment. The same is suitable as a dry fertilizer which will easily drill in drilling machine. The moisture in the soil will furnish the necessary water to enable the ammonium sulfate to react on the calcium phosphate to form tri-ammonium ortho phosphate; or the mixture of ammonium sulfate and calcium phosphate may be heated in a closed vessel up to the point of volatilization of the ammonium salt, any ammonia gas liberated being led off to a gasometer and saved. If the reaction is continued, a part of the ammonia is driven off as follows:

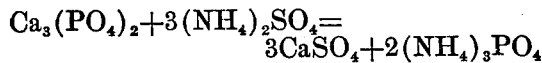

forming di-ammonium phosphate which is difficultly soluble in water.

Another modification of the process consists in heating the ammonium sulfate with calcium phosphate in the presence of water and forming ammonium phosphate. In place of ammonium sulfate, any other ammonium salt capable of reacting with the calcium phosphate forming ammonium phosphate may be used, provided no by-products injurious to plant life are produced at the same time. For example, oxalates, citrates, borates, acetates, phosphates, carbonates, chlorids, fluorids, phosphites, silico fluorids, and nitrates may be used. It should be noted that some of these salts are not as suitable as ammonium sulfate. For instance, ammonium chlorid will form ammonium phosphate and calcium chlorid, the latter being toxic to plant life besides being objectionable because of its hygroscopic qualities. Ammonium nitrate forms, besides the ammonium phosphate, calcium nitrate, which is a valuable fertilizer but slightly objectionable because of its hygroscopic properties. The salt that I prefer to use is ammonium sulfate.

The advantages of my process will be readily appreciated. There are many places where ground phosphate rock is available but no sulfuric acid plants are near to furnish the sulfuric acid. The transportation of sulfuric acid is expensive, and the handling thereof is objectionable, for well-known reasons. The ammonium salts, especially ammonium sulfate, being dry powders, can be shipped to the point of destination without any of the disadvantages referred to in the case of sulfuric acid. Furthermore, in the ordinary treatment of phosphate rock, two equivalents of sulfuric acid are necessary to render the phosphoric acid available, while in my process one equivalent of sulfuric acid in the form of ammonium sulfate is sufficient to make practically all the phosphoric acid available as ammonium phosphate, which is considered one of the ideal fertilizers of the present day.

As stated before, ammonium salts may be mixed with the phosphate rock to form a dry powder, which, when applied to the soil will gradually render the phosphoric acid available; or the ammonium phosphate may be formed by heating the mixture either with or without water.

I claim:

1. A process of treating phosphate material comprising intimately mixing finely powdered phosphate rock and an ammonium salt, and heating the same to form ammonium phosphate.

2. A process of treating phosphate material comprising intimately mixing finely powdered phosphate rock and ammonium sulfate, and heating the same to form ammonium phosphate.

3. A process of treating phosphate rock comprising heating phosphate rock and an ammonium salt in the presence of water to form ammonium phosphate.

4. A process of treating phosphate rock comprising heating phosphate rock and ammonium sulfate in the presence of water to form ammonium phosphate.

5. A fertilizer comprising pulverized phosphate material and an ammonium salt.

6. A fertilizer comprising pulverized phosphate rock and ammonium sulfate.

In testimony whereof I have signed my name to this specification.

HENRY BLUMENBERG, Jr.